T. LARSSON.
WHEEL TRIMMING MACHINE.
APPLICATION FILED APR. 17, 1920.

1,377,991.

Patented May 10, 1921.
3 SHEETS—SHEET 1.

INVENTOR
Thure Larsson

T. LARSSON.
WHEEL TRIMMING MACHINE.
APPLICATION FILED APR. 17, 1920.

1,377,991.

Patented May 10, 1921.
3 SHEETS—SHEET 3.

Witnesses
Harold W. Eaton
J. Calvin Bright

INVENTOR
Thure Larsson
BY
Clayton R. Jenks
ATTORNEY

UNITED STATES PATENT OFFICE.

THURE LARSSON, OF WORCESTER, MASSACHUSETTS, ASSIGNOR TO NORTON COMPANY, OF WORCESTER, MASSACHUSETTS, A CORPORATION OF MASSACHUSETTS.

WHEEL-TRIMMING MACHINE.

1,377,991.  Specification of Letters Patent.  Patented May 10, 1921.

Application filed April 17, 1920. Serial No. 374,575.

*To all whom it may concern:*

Be it known that I, THURE LARSSON, a citizen of the United States of America, residing at Worcester, in the county of Worcester and State of Massachusetts, have invented certain new and useful Improvements in Wheel-Trimming Machines, of which the following is a full, clear, and exact specification.

My invention relates to a wheel trimming machine and more particularly to a device adapted for trimming the lead bushings of grinding wheels.

It is the practice in the grinding wheel art to cast a bushing of lead or lead alloy around the hole in the wheel through which the spindle of the machine engages. To give the wheel a neat and finished appearance it is necessary to trim this bushing on the wheel side to make it flush with the latter. Heretofore this trimming has been done manually by means of a trimming knife somewhat on the order of a chisel, or in some cases by clamping the wheel in a chuck, rotating the chuck and at the same time feeding a cutting tool into operative position by means of a hand screw. This manual trimming has been found to have the objectionable features of imposing a severe physical strain on the operator and of resulting, especially in the case of coarse grained wheels, in an uneven and unfinished appearance of the trimmed bushing. The second method described involves a number of operations such as placing the wheel in the chuck, clamping the jaws on the wheel with a wrench, starting the rotation of the relatively heavy chuck, feeding the cutting tool to the wheel and again stopping the chuck, these various operations taking considerable time and being, to a large extent, unsuited for rapid production work; especially in the case of small and specially shaped wheels.

It is one object of my invention to overcome such objectionable features and construct a machine which is simple in design, highly efficient in operation and by the use of which I am enabled to increase production with a minimum of manual labor and expense.

A further object of my invention is to provide a device of this type in which various sized wheels may be rotated positively, but without being clamped to the driver, by means of a driven roller frictionally engaging a surface of the wheel.

A still further object of the invention is to avoid the necessity for using a centering spindle or chuck and to correctly position a wheel relative to a cutting tool for rotation about the wheel axis by swinging driving rollers inwardly to positions equidistant from said axis into engagement with the wheel periphery.

In addition to these objects, the invention is further designed to provide certain improvements for controlling the feed of a cutting tool with relation to the wheel bushing with more accuracy than has hitherto been possible, and for otherwise enhancing and increasing the efficiency of devices of this character.

To these and other ends, the invention consists in certain improvements and combination of parts, all as will hereinafter be more fully described, the novel features being pointed out in the claims at the end of the specification.

Figure 2:
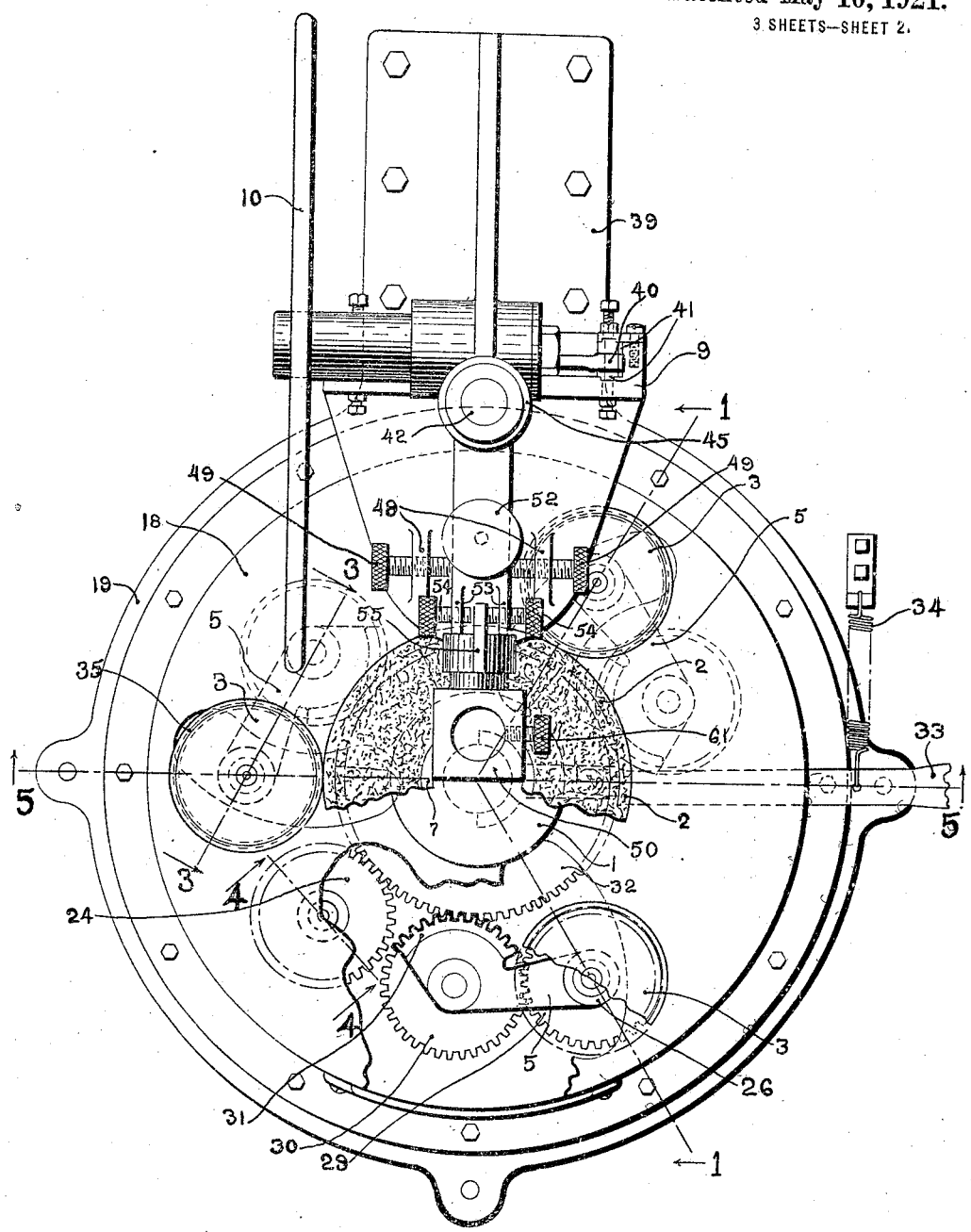
Fig. 2 is a plan view of the machine with a wheel placed thereon, part of the wheel and casing being broken away.
Figure 3:
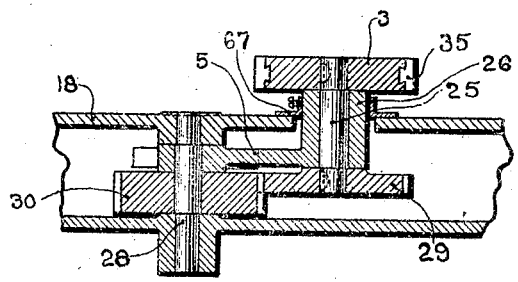
Figure 4:
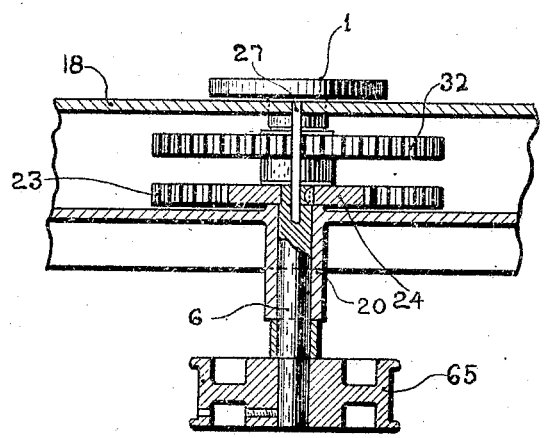
Figure 5:
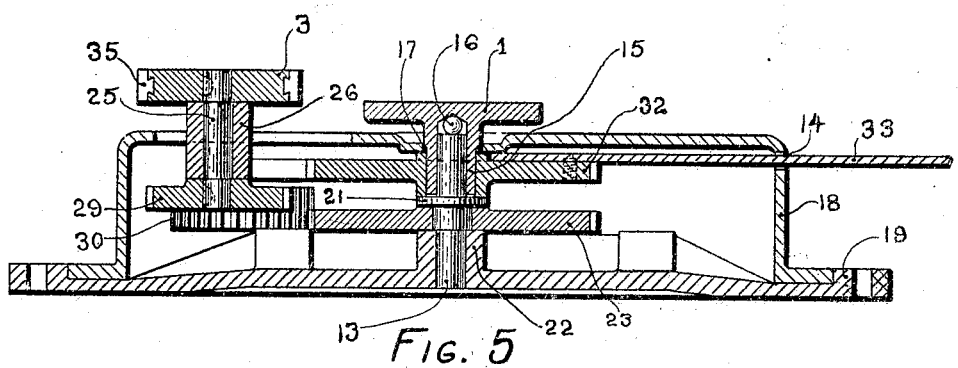

Figs. 3, 4 and 5 are sections on the lines 3—3, 4—4 and 5—5 respectively of Fig. 2, Fig. 3 showing a dust and grit excluding plate which is, for simplicity of illustration, not shown in any of the other figures;

Fig. 6 is an elevation of the stop member for the cutting tool support; and

Fig. 7 is a detail view showing the manner of mounting the cutting tool.

Figure 1:
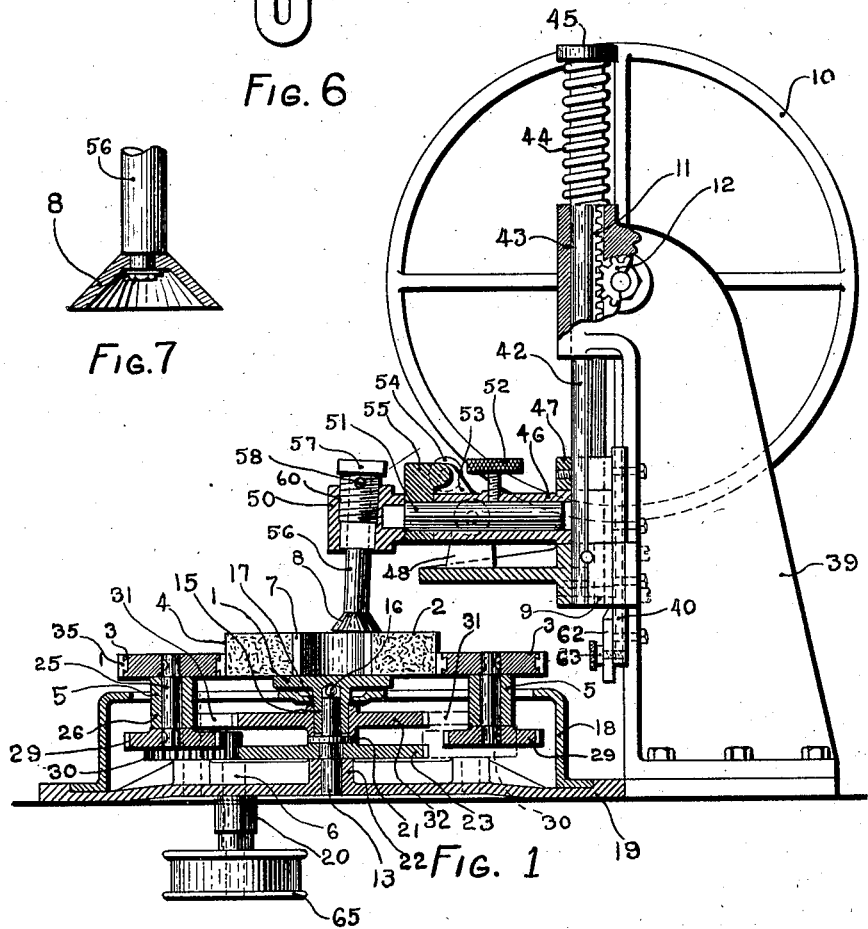
Figure 1 is a cross section of the machine taken on the line 1—1 of Fig. 2 and showing part of the cutting tool feeding mechanism in section to more clearly bring out the details of the construction.

In accordance with my invention I provide a device particularly adapted for trimming wheels and particularly the bushings of grinding wheels, in which the wheel is rotated, by means of a positively driven roller frictionally engaging the surface thereof, in engagement with a cutting tool adjustably mounted relative thereto. The preferred embodiment of my invention comprises a preferably horizontal wheel support or turntable 1 adapted to receive the wheel 2 being trimmed. To rotate the wheel I provide one or more positively driven rollers 3 adapted to frictionally engage and drive against the wheel periphery 4. By using three of such rollers the wheel may be centered and for this purpose, as well as to accommodate different sized wheels, the rollers 3 are mounted on arms 5 (Figs. 2 and 3) to swing toward the wheel axis. Suitable mechanism, such as a train of gears, connects one or more of the rollers with a power shaft 6 to drive the same continuously. For trimming the bushing 7 while the wheel is being driven, I provide a cutting tool 8 (Fig. 1), preferably of the well-known conical cup type used in dressing grinding wheels, mounted for adjustment at right angles to the wheel axis on a support or slide 9, which, in turn, is movable in a vertical direction. This support is preferably operated by means of a hand wheel 10 connected therewith through a suitable drive which may comprise a rack 11 and a pinion 12 (Fig. 1.)

Proceeding now to a more detailed description of the device, I have shown the wheel support or turntable 1 rotatably mounted on a stud 13 by having a centrally disposed sleeve 15 on the support engaged over the upper end of the said stud. To minimize the friction and take up the end thrust a ball 16 is placed within the sleeve 15 and on the end of the stud 13. This sleeve 15 has a rotating fit in an opening 17 in a casing 18, the purpose of which will be described later on. The friction between the wheel side and the turntable causes the latter to rotate with the wheel.

The mechanism for driving and swinging the rollers 3 is mounted on a base 19 and is, for the most part, covered by the casing 18, forming with the base a substantially inclosed chamber. Near the center of the base is fastened the short, upright stud 13, above referred to, having a collar 21 thereon between its ends. Between this collar and an upwardly extending annular flange 22 on the base and surrounding the stud is rotatably mounted the gear 23 which forms part of the train of gears for driving the rollers 3. The drive for this gear comprises the power shaft 6 journaled in an elongated bearing 20 in the base 19 and carrying at its upper end a gear 24 (Figs. 2 and 4) meshing with the gear 23 and provided at its lower end, which projects below the base 19, with a pulley 65. To steady the power shaft, I provide a pin 27 fastened at one end to the casing 18 and having its opposite end fit into a recess at the upper end of the shaft. The rollers 3, which are preferably three in number, are rotatably mounted on spindles 25 supported in bearings 26 on the ends of the arms 5, which latter are journaled on vertical pins 28, preferably fixed at their ends to the base 19 and casing 18. In order that the rollers 3 may at all times be driven from the gear 23, the lowers ends of their spindles are provided with gears 29 meshing with gears 30 rotatable on the pins 28 and arranged below the arms 5. The pins 28 are spaced equidistantly from the central stud 13 and 120° apart, and, of course, the same is true of the rollers 3, the arms 26 being of equal length. This arrangement provides for the automatic centering of the wheel on its support when the rollers are swung inwardly against the wheel previously placed on the support.

Provision has to be made for easily and simultaneously swinging the rollers 3 into engagement with a wheel placed on the support 1 and to this end I provide the arms 5 with segmental racks 31 (Fig. 2) meshing with a gear 32 rotatably mounted on the central stud 13 and sleeve 15. Means for rotating this gear 32 is provided, which may comprise a hand lever 33 rigidly connected to the gear and extending through a slot 14 in the side of the casing where it can be readily grasped by the operator. The lever is moved in a direction to bring the rollers to their inoperative position, preferably by means of a spring 34. From this construction it will be seen that the rotation of the gear 32 will rock all the arms 5 simultaneously through the segmental rack 31 and to allow of such rocking movement the top of the casing is provided with arcuate slots where the bearings 26 extend therethrough. These slots may be covered by dust and grit excluding plates 67 (shown only in Fig. 3) connected to the bearings 26 and movable therewith.

To prevent wearing away or otherwise marring the face of the wheel being trimmed, the rollers 3 are preferably provided with rims 35 of some soft metal or alloy, such as Babbitt metal. It is also desirable to avoid excessive throw of the lever 33 to provide sets of rollers of different sizes for different sized wheels, and to this end the rollers are made readily removable from their spindles, being splined to their shafts to prevent rotary movement, but allowing endwise movement.

On a standard 39 bolted to the base 19 is mounted the cutting tool 8 and the means for adjusting it to its work. To provide for the vertical movement of the cutting tool this standard has slideways 40 bolted or otherwise fastened to its opposite sides. The support 9 for the cutting tool is slidably mounted on these ways and is provided with adjustable bearing blocks 41 which engage the ways, whereby they tighten or loosen the sliding fit between these members, as may be desired. This support or slide 9 has fastened to it an upwardly extending bar 42 which extends through and some distance above the bearing 43 at the upper end of the standard. The rack 11 previously referred to is formed on this bar and the pinion 12 meshing with it is journaled in the standard and operated by the hand wheel 10. In order to make it unnecessary for the operator to raise the cutting tool by hand, I provide a spring 44 between the head 45 on the upper end of the bar 42 and the top of the standard. This spring is of sufficient strength to raise the cutting tool away from the wheel after the hand wheel is released by the operator after each cutting operation, thus allowing the ready removal of the wheel and the placing of an untrimmed wheel in its place.

To allow the cutter to swing about the axis of the bar 42, a tubular member 46 is journaled on the bar and is held in position between the support 9 and a collar 47 fastened to the bar. To bring about this angular adjustment and to hold the tubular member in its adjusted position, the slide 9 is formed with opposing lugs 48 which are provided with set screws 49 engaging the said tubular member.

To provide for the adjustment of the cutting tool at right angles to the wheel axis, I provide the head 50 in which it is mounted with a stem 51. This stem telescopically engages the tubular member 46 and is held in position by a set screw 52. Further means for adjusting the position of the cutter are provided by having opposing lugs 53 on the tubular member which are provided with set screws 54 engaging opposite sides of a projection 55 rigid with the stem. The cutting tool bar 56, on the end of which the cutting tool is rotatably mounted, (Fig. 7) telescopes into a nut 57 and is held rigidly in place as by a screw 58. This nut engages a threaded opening 60 in the head, which opening is slightly inclined to the vertical to give the cutting tool the proper cutting angle and by rotating this nut I am enabled to obtain a fine up and down adjustment of the cutting tool. The nut is held in adjusted position by means of a set screw 61 (Fig. 2). These various adjustments permit of setting the cutting tool with great precision to the particular work at hand.

To limit the downward movement of the cutter support or slide 9, I preferably provide on one of the slideways 40 an adjustable stop member 62 (Figs. 1 and 6) which may be held in adjusted position as by means of a screw 63 extending through a slot 66 in the stop member into the slideway 40 and so clamping the former against the latter. Without this stop the limit of the downward movement of the slide is determined by the force the operator applies to the hand wheel and thus the bushings of wheels of a given thickness may be trimmed unevenly and the cutting tool dug into the wheel, particularly when the machine happens to be operated by an inexperienced operator. With the stop set for a given thickness of wheel, the cutter cannot be lowered beyond that point and all the wheels of that thickness will therefore be evenly trimmed, even in the hands of an inexperienced operator. The adjustment of the nut 57 in which the cutting tool is mounted may serve as a fine adjustment for setting the latter more accurately to its work after the adjustable stop 62 has been set and also to take care of the wear of the cutter without readjusting the stop 62.

In operation, the device is supported at a convenient height from the floor and the power shaft is driven by any suitable means. The operator places the wheel to be trimmed on the turntable 1 between the rollers 3, the rollers being in their outward position and in this position permitting the placing in position of wheels of different sizes. The wheel being positioned, he grasps hand lever 33 with one hand and by the operation of this lever he swings the rapidly rotating rollers inwardly against the periphery of the wheel, thus centering it on the support and rotating it by the frictional drive of the rollers on the wheel periphery. The cutting tool 8, if it has not previously been adjusted, is now adjusted by means of the various adjustments above described, so as to neatly and accurately trim the bushing, and the operator, with his other hand, then brings it into operative position to effect this trimming by rotating the hand wheel 10. As soon as the bushing is trimmed on one side of the wheel, which takes but a moment, the hand wheel 10 and lever 33 are released and the parts are returned to their initial position by the springs 34 and 44. The operator then turns the wheel and repeats the operation on the other side of the wheel.

It will be seen that by the use of my device I am enabled to efficiently and neatly trim the lead bushings of grinding wheels in a minimum of time and with a consequent increase in production, and while I have explained my invention with reference to a machine having the precise details of construction shown and described, it should be understood that this is simply by way of illustration in order that the invention may be understood and that the various embodiments are comprehended within the spirit and scope of the claims.

Having described the invention, what I claim as new and desire to secure by Letters Patent of the United States is:

1. A wheel trimming machine comprising a cutting tool, a support for the same, and means frictionally driving against and movable relative to the surface of the wheel to rotate said wheel while in engagement with the cutting tool.

2. A wheel trimming machine comprising a cutting tool, a support for the same to hold it in operative position relative to the wheel, and means for supporting and rotating the wheel comprising a driving roller rotated against the surface of said wheel.

3. A wheel trimming machine comprising a cutting tool, a support therefor and a roller adapted to drive against the periphery of the wheel while the cutting tool is held in operative engagement therewith.

4. A wheel trimming machine comprising a cutting tool, a support for the same to hold it in operative position relative to the wheel, a support for the wheel, a roller adapted to frictionally drive against the surface of the wheel and means for relatively moving the wheel and roller into driving engagement.

5. A wheel trimming machine comprising a cutting tool, a support therefor to hold it in operative position relative to the wheel, means to rotate the wheel comprising driving rollers adjustable relative to the wheel and means to move said rollers into driving engagement with the periphery of the wheel.

6. A wheel trimming machine comprising a cutting tool, a support for the same, means adapted to adjustably position the cutting tool relative to the wheel and means frictionally driving against and movable relative to the surface of said wheel to rotate it.

7. A wheel trimming machine comprising a cutting tool, a support therefor, a substantially horizontal support for the wheel, a wheel driving roller, means for moving the wheel and roller into peripheral driving engagement, and means to relatively move the tool support and the wheel support to bring the tool and wheel into operative engagement.

8. A wheel trimming machine comprising a wheel support, a wheel centering and rotating means comprising three or more rollers mounted on spindles, pivoted supporting arms for said spindles, means for simultaneously swinging said spindle supporting arms to cause the rollers to operatively engage a wheel placed on said wheel support, and means for driving one of said rollers in all positions of the same.

9. A wheel trimming machine comprising a rotatable wheel support, driving rollers adapted to engage the periphery of a wheel on said support, arms carrying said rollers and pivotally mounted for movement of the rollers toward and from the wheel axis, segmental racks rigidly connected to said arms and having their axes coinciding with the pivotal axes of the arms, a gear mounted to rotate about the axis of the wheel support and meshing with said segmental racks and means for rotating said gear.

10. A wheel trimming machine comprising a rotatable wheel support, a driving roller adapted to engage the periphery of a wheel on said support, a pivotally mounted arm carrying said driving roller and permitting movement of the latter relative to the wheel axis, a gear having its axis coinciding with that of the roller and connected to drive the same, a second gear meshing with the first-named gear having its axis coinciding with the pivot of said arm and a positively driven gear meshing with said second gear and having its axis coinciding with the wheel axis.

11. A wheel trimming machine comprising a cutting tool, a vertically slidable support therefor, a substantially horizontal wheel support, means for raising the cutting tool away from its work while a wheel is being placed in position on the support, means having a rolling frictional engagement with the wheel to rotate it, and means for lowering the cutting tool into operative position.

12. A wheel trimming device comprising a substantially horizontal wheel support, a wheel driving roller, means for moving the wheel and roller into peripheral driving engagement, a cutting tool and means for adjusting the cutting tool vertically and laterally to bring it into operative engagement with the wheel for trimming.

13. A wheel trimming machine comprising a turntable support for a wheel, a wheel driving means frictionally engaging and driving against the periphery of the wheel, a cutting tool, a support therefor slidable in a direction parallel to the wheel axis and a limit stop for said cutting tool support whereby the cutting tool cannot be lowered below the wheel side being trimmed.

14. A wheel trimming machine comprising a cutting tool, a support therefor, and an adjustable limit stop for the support and means on the support for coöperating with the adjustable stop for making a precision adjustment of the tool to compensate for wear.

Signed at Worcester, Massachusetts, this 15th day of April, 1920.

THURE LARSSON.